United States Patent [19]

Akasu

[11] Patent Number: 4,811,714
[45] Date of Patent: Mar. 14, 1989

[54] IGNITION TIMING CONTROL DEVICE FOR INTERNAL COMBUSTION ENGINE

[75] Inventor: Masahira Akasu, Hyogo, Japan

[73] Assignee: Mitsubishi Denki Kabushiki Kaisha, Tokyo, Japan

[21] Appl. No.: 592,209

[22] Filed: Mar. 22, 1984

[30] Foreign Application Priority Data

Mar. 22, 1983 [JP] Japan .................................. 58-48181
Apr. 22, 1983 [JP] Japan .................................. 58-71717
Jun. 2, 1983 [JP] Japan .................................. 58-99778

[51] Int. Cl.$^4$ .............................................. F02D 5/15
[52] U.S. Cl. .................................................... 123/425
[58] Field of Search ........................................ 123/425

[56] References Cited

U.S. PATENT DOCUMENTS 4,274,379 6/1981 Iwata et al. ........................... 123/425
4,328,779 5/1982 Hattori et al. ................... 123/425 X
4,452,206 6/1984 Haraguchi et al. ................. 123/425

FOREIGN PATENT DOCUMENTS 2918420 11/1980 Fed. Rep. of Germany .
2930540 2/1981 Fed. Rep. of Germany .
3047079 8/1981 Fed. Rep. of Germany .
3009046 9/1981 Fed. Rep. of Germany .
3027532 2/1982 Fed. Rep. of Germany .
3123911 4/1982 Fed. Rep. of Germany .
2659561 5/1983 Fed. Rep. of Germany .
129260 8/1982 Japan .................................. 123/425
129261 8/1982 Japan .................................. 123/425

Primary Examiner—Tony M. Argembright
Attorney, Agent, or Firm—Sughrue, Mion, Zinn, Macpeak & Seas

[57] ABSTRACT

An ignition timing control device for an internal combustion engine in which optimum ignition timing control is provided under all operating conditions. Control values for providing reference ignition timing characteristic are stored in a memory. These values are read out from the memory in response to the output of an engine operating condition sensor and are corrected using a correction value obtained in response to the output of a knock detector with the correction value having a positive, zero or negative value. Accordingly, the reference ignition timing characteristic is maintained near the optimum ignition timing of the knock limit of the engine to thus suppress the occurrence of engine knock at the start of a control operation.

1 Claim, 4 Drawing Sheets

IGNITION TIMING CONTROL DEVICE FOR INTERNAL COMBUSTION ENGINE

BACKGROUND OF THE INVENTION

The present invention relates to an ignition timing control device for an engine which detects the occurrence of knocking in the engine and controls the ignition timing accordingly.

In general, a conventional ignition timing control device of this type employs a feedback control system in which an ignition signal, produced with a timing based on a preset reference ignition timing characteristic, is delayed in phase by a certain angle or an angle corresponding to knocking strength whenever engine knock occurs. On the other hand, if no engine knock is present, the amount of phase shift is decreased with a predetermined time constant.

In the feedback control system, the angle of delay from the reference ignition timing is utilized to suppress engine knock, and accordingly the reference ignition timing must be set at a point advanced in phase from the knock limit of the engine. Therefore, at the edge of the control range, the ignition timing is always advanced from the knock limit, thus resulting in a high level of engine knock. Accordingly, it is desirable that the reference ignition timing be set slightly advanced from the knock limit.

However, it is practically impossible to do so for all operating conditions of the engine, and it is unavoidable for the reference ignition timing to lag the ignition timing which corresponds to the knock limit. Ignition thus occurs later than for the optimum ignition timing of the knock limit, and hence it is impossible to provide optimum ignition timing control under all operating conditions.

SUMMARY OF THE INVENTION

Accordingly, an object of the invention is to provide an ignition timing control device for an engine in which control values for providing reference ignition timing characteristics are stored in addresses in memory means, the data stored is read out in response to the output of an engine operating condition sensor, the data thus read out is corrected using a correction value obtained by applying the output of a knock detector to control the ignition timing with the correction value being controlled to have a positive value, zero or a negative value so that the reference ignition timing characteristic is set near the optimum ignition timing of the knock limit to thus suppress the occurrence of engine knock at the start of control, and in the condition also where the reference ignition timing lags the optimum ignition timing of the knock limit, optimum ignition timing control is performed, whereby optimum ignition timing is obtained for all operating conditions of the engine.

DESCRIPTION OF THE PREFERRED EMBODIMENTS

Figure 1:
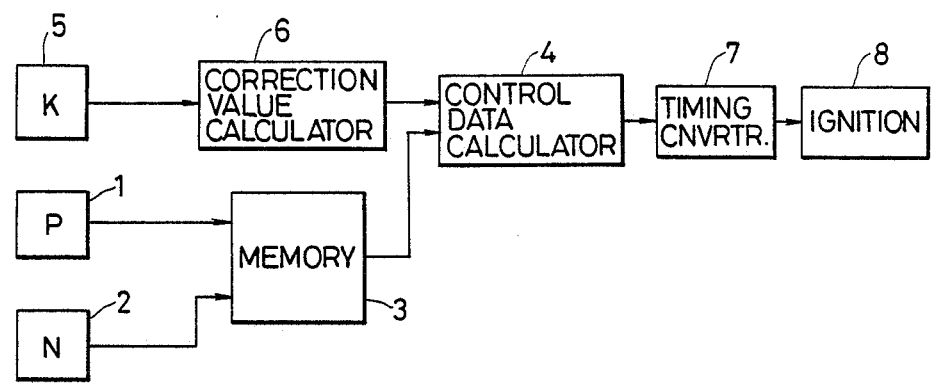
FIG. 1 is a block diagram of an ignition timing control device of the invention.

FIG. 1 shows the overall arrangement of an ignition timing control device according to the invention.

According to the engine load condition detected by load detector 1 and the engine speed (r.p.m.) detected by speed detector 2, control data, used to provide reference ignition timing, is read from a memory 3 from addresses arranged two-dimensionally according to load conditions and speeds of the engine. The control data thus read is applied to a control data calculator 4. In the control data calculator 4, standard control data from the memory 3 is combined with a correction value calculated by a correction value calculator 6 from the knocking signal detected by the knock detector 5 to thus produce the final control data. A timing signal for the control data is produced by a timing converter 7 to control the ignition device 8. In the correction value calculator 6, the correction value is adjusted (increased or decreased) according to the presence or absence of the detection signal of the knock detector 5. That is, control is effected such that the range of adjustment has positive and negative values.

A specific example of an ignition timing control device according to the invention will be described with reference to FIG. 2.

Figure 2:
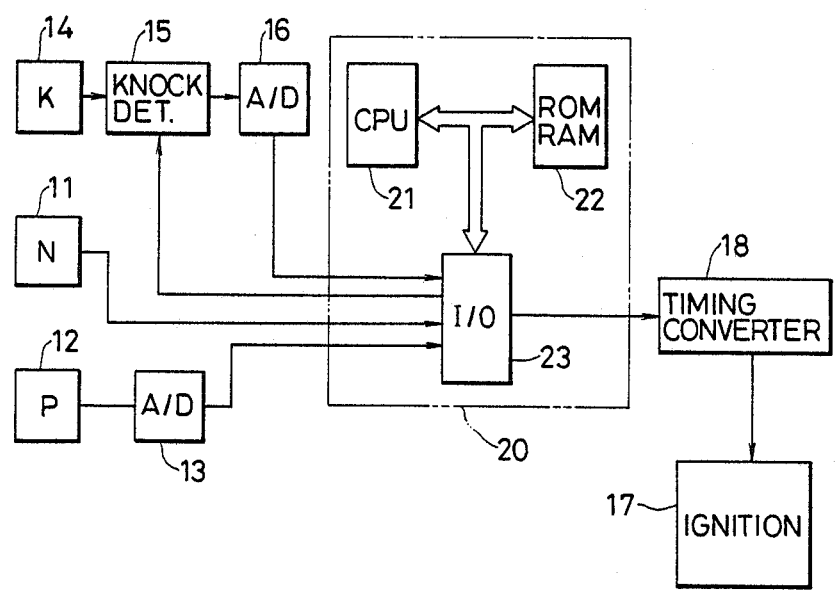
FIG. 2 is a more detailed block diagram of an ignition timing control device of the invention.

In FIG. 2, reference numeral 11 designates a crank angle sensor for producing reference crank angle signals with rotation of the engine; 12, a pressure sensor for detecting the intake pressure to provide a pressure signal; 13, a first A/D (analog-to-digital) converter for converting the output pressure signal of the sensor 12 into a digital signal; 14, an acceleration sensor mounted on the engine for detecting the presence of vibration of the engine; 15, a knock detector for discriminating from the detection output of the acceleration sensor 14 knocking components produced by the knocking of the engine for producing a knocking signal at a level corresponding to the knocking strength; 16, a second A/D converter for converting the output signal of the knock detector 15 into a digital signal; and 20, a microcomputer including a microprocessor (or CPU) 21, a memory 22, and an interface circuit 23 (an input and output signal processing unit). Further in FIG. 2, reference numeral 17 designates an ignition circuit which is controlled by the microcomputer; and 18, a timing converter for producing a timing signal which is applied to the ignition circuit 17.

The ignition timing control device thus constructed operates as follows:

As the engine rotates, the crank angle sensor 11 detects a reference rotation angle position of the engine (for instance, the top-dead-center position) once each ignition period, to produce a crank reference angle pulse which is applied to the interface 23 of the microcomputer 20. The pressure sensor 12 detects the suction pressure of the intake manifold of the engine and produces in response thereto a pressure signal, the level of which is indicative of the detected pressure. The intake manifold suction pressure changes quickly in response to engine load conditions. Therefore, the engine load condition can be detected from the level of the pressure signal which is obtained by detecting the manifold pressure. The output pressure signal of the pressure sensor 12 is converted to a digital signal by the first A/D converter 13 as described above. The digital signal is applied to the interface 23.

The acceleration sensor 14 is mounted on the engine, as described above, to detect vibration of the engine. The knocking component in the vibration of the engine, superposed on a noise signal corresponding to mechanical noise accompanying the operation of the engine, is included in the detection output of the acceleration sensor 14. The knock detector 15 discriminates the knocking component from the detection output of the acceleration sensor 14 and outputs the knocking signal, the level of which corresponds to the knocking strength. The knocking signal is converted into a digital signal by the second A/D converter 16, which digital signal is applied to the interface 23. The knock detector 15 is reset by the interface 23 in response to an instruction from the microprocessor 21 so as to be ready for detecting engine knock.

The memory 22 of the microcomputer 20 includes a ROM (read-only-memory) and a RAM (random access memory). The ROM has addresses corresponding to various speeds of the engine and load conditions of the engine. The ROM provides what is here termed an advance angle map in which reference ignition advance angles for each address are stored.

The microcomputer 20 calculates the optimum ignition timing from the output data of the crank angle sensor 11, the pressure sensor 12 and the acceleration sensor 14, thereby to interrupt the flow of current through the ignition coil in the ignition circuit using the timing converter 18 with the optimum ignition timing thus calculated, thereby to accurately control the ignition of the engine.

Figure 3:
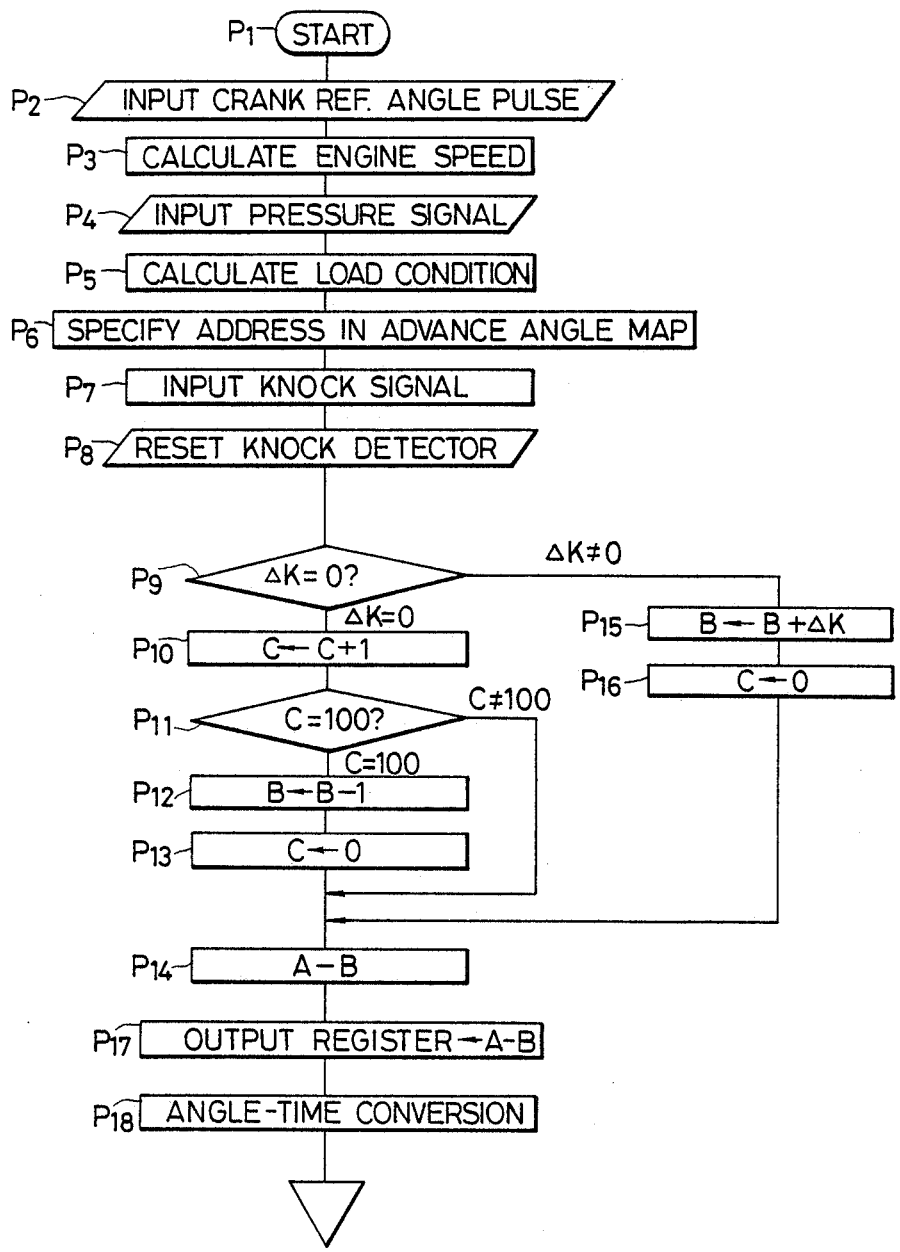
FIGS. 3 through 5 are flow charts describing operations of the ignition timing control device of the invention for three respective preferred embodiments thereof.

FIG. 3 is a flow chart showing the operation of the microcomputer 20. In FIG. 3, reference characters P1 through P18 designate various operating steps of the microcomputer.

The control operation of the invention is carried out once each ignition period, that is, once for each crank reference angle pulse.

In step P2, the crank reference angle pulse is inputted. In step P3, the period of the preceding crank reference angle pulse is obtained and converted into a speed (a number of revolutions per minute). In step P4, the pressure signal is inputted. In step P5, the load condition of the engine is calculated. In step P6, an address in the advance angle map is specified according to the speed and the load condition which have been determined in steps P3 and P5, whereby the corresponding reference advance angle data is read and stored in a register A. In step P7, the knock signal ($\Delta K$) is inputted. In step P8, the signal for resetting the knock detector 15 is produced so as to be ready for detecting engine knock in the following time period.

In step P9, the state (presence or absence) of the knock signal ($\Delta K$) inputted in step P7 is detected; that is, it is detected whether or not $\Delta K=0$. If $\Delta K=0$, in step P10, one is added to the content of a register C which is provided to determine the presence or absence of engine knock and operates as a counter, and the result of the addition is stored therein. In step P11, it is detected whether or not the content of the register C has reached "100", that is, it is detected whether or not the knock signal ($\Delta K$) has been zero over 100 ignition periods. If the content is 100 (C=100), in step P12, one is subtracted from the content of a register B provided for advance angle correction, and the result of the subtraction is stored. In step P13, the register C is reset so as to be ready for the next 100-ignition-period count operation. If, in step P11, C≠100, then the content of the register B is maintained as it is; and step P14 is effected.

If a nonzero knock signal ($\Delta K$) is detected in step P9 ($\Delta K\neq 0$), then in step 15, the data $\Delta K$ is added to the content of the register B for advance angle correction so that the correction value is increased according to the knock strength. In step P16, the register C is reset so as to be ready for the 100-ignition-period count operation.

Accordingly, the value (correction value) of the register B for advance angle correction, which is increased or decreased according to the state of knock, depends on the presence or absence of the knock signal detected every ignition period. That is, when a nonzero knock signal is present, the correction value is increased according to the knock strength, and when a zero-value knock signal is present, the correction value is decreased by one every 100 ignition periods. Thus, the change of the value can take a positive or negative value. In the above-described embodiment, the value of the content of the register B is decreased by one if there is no knock during 100 consecutive ignition periods; however, it should be noted that the invention is not limited thereto or thereby.

In order for the value (reference advance angle) read and stored in step P6 to be corrected by the advance angle correction value thus determined to the final control value (advance angle control value), in step P14, the value of the register B is subtracted from the value of the register A, and the result of subtraction is stored in an output register in step P17.

The result of the subtraction is a data value which indicates in angle the ignition position which is to be controlled. In step P18, the data is converted into time data representing a delay from the reference angle pulse position. The angle-to-time conversion can be readily achieved according to the speed data in step P3.

The advance angle control data, which has been converted into the time data in step P18, is preset in a counter in the timing converter 18 in synchronization with the reference rotation angle pulse. When the content of the counter reaches zero in a period of time corresponding to the advance angle control data, the ignition timing signal is produced to interrupt the application of current to the ignition coil in the ignition circuit, thereby to determine the ignition timing.

As is apparent from the above description, according to the invention, the engine ignition timing is determined according to a feedback control system in which the reference ignition timing is determined according to memory data programmed according to the operating conditions, and the reference ignition timing is advanced or delayed by the correction value which is changed in the positive or negative direction according to the knock detection data. Accordingly, even in the operational mode in which the reference ignition timing lags the ignition timing corresponding to the knock limit, feedback control can be performed by using the knock signal with the actual control ignition timing being allowed to lead the reference ignition timing. Therefore, for all operating conditions, the optimum ignition timing of the knock limit can be obtained by the feedback control system while the knock signal is being detected. Thus, the spark advance control can be achieved with high accuracy. Furthermore, it is not necessary for the reference ignition timing to be set so that it leads the ignition timing of the knock limit. Even if the reference ignition timing is set for the optimum ignition timing of the knock limit, feedback control utilizing knock detection can be performed under all operating conditions. Therefore, the difficulty of the engine knocking strongly at the edge of the control range when the reference ignition timing is advanced excessively is prevented.

Figure 4:
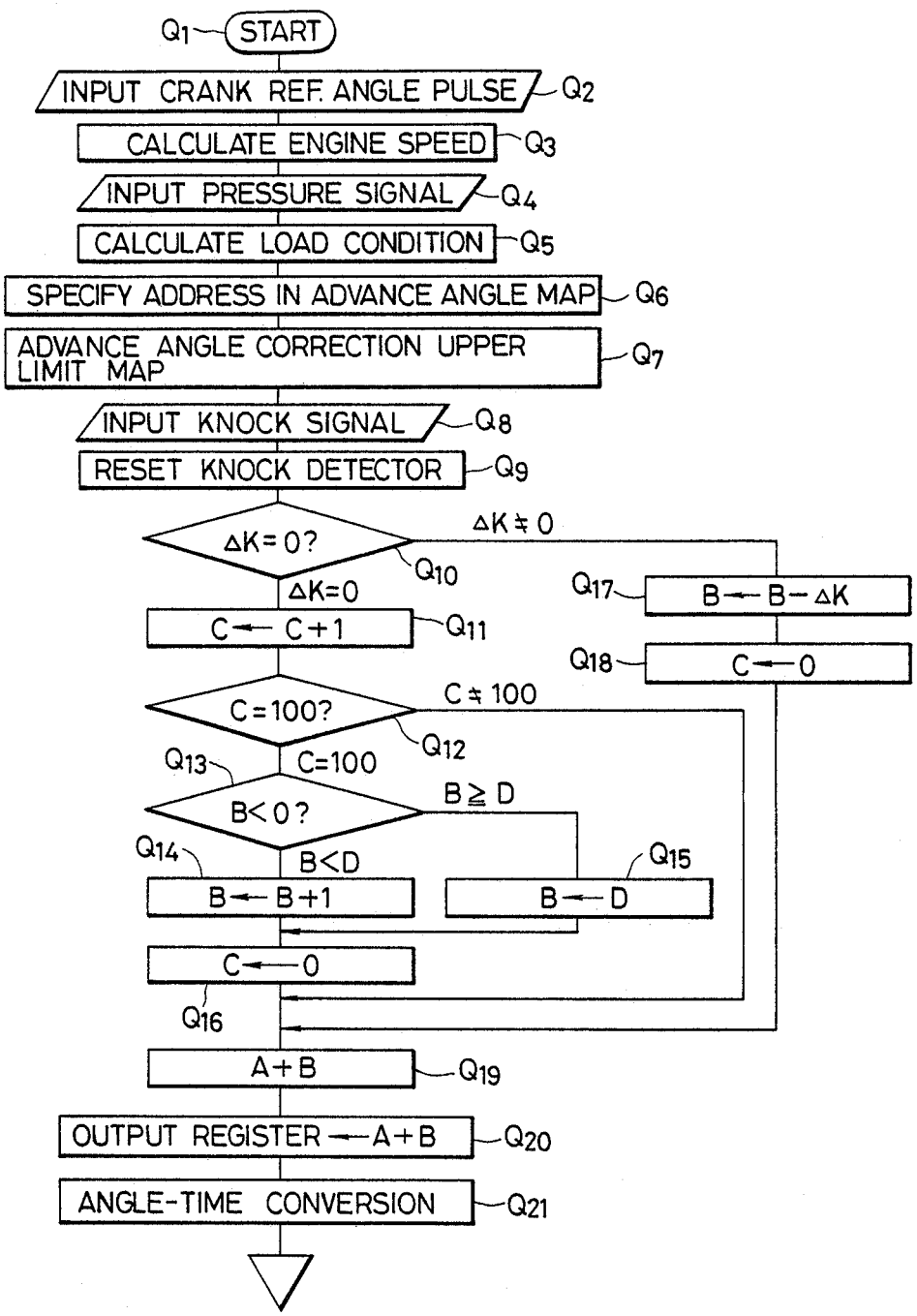

A second embodiment of the invention can be provided by modifying the operating procedure of the microcomputer 20 in FIG. 2 as indicated in the flow chart in FIG. 4. That is, in the engine ignition timing control device, control values providing reference ignition timing characteristics are stored in the memory, the stored data is read out in response to the output of an engine operating condition sensor, and a correction value obtained in response to the output of the knock detector is used to correct the data thus read out. The correction value is controlled to be positive, zero and negative in predetermined ranges. In the region where the knock limit does not exceed the MBT (minimum advance for best torque) of the engine, the reference ignition timing characteristic is set near the optimum value of the knock limit to suppress engine knocking at the start of control. In the operating region also where the reference ignition timing lags the optimum ignition timing of the knock limit, optimum ignition timing control is carried out. In the region where the knock limit exceeds the MBT of the engine, the reference ignition timing characteristic is set to the MBT to determine the correction value range so that the ignition timing does not exceed the MBT. Accordingly, in the engine ignition timing control device, the optimum ignition timing can be obtained in all the operating modes.

In the second embodiment, the memory 22 in the microcomputer 20 in FIG. 2 includes a ROM (read-only memory) and a RAM (random access memory). The ROM has addresses corresponding to various load conditions of the engines. The memory provides an advance angle map in which the reference ignition advance angles for various operating modes of the engine are stored, and an advance angle correction upper limit map in which the upper angle advance limits of correction data for knock suppression control are stored.

The flow chart of FIG. 4 will be described. The flow chart includes steps Q1 through Q21. Steps Q1 through Q6 in FIG. 4 are in the same as steps P1 through P6 in FIG. 3.

Similarly as in step Q6, in step Q7 an address corresponding to the engine speed and load condition is specified in the advance angle correction upper limit map and the corresponding advance angle correction upper limit is read and stored in a register D.

In step Q8, the knock signal ($\Delta K$) is inputted. In step Q9, the signal for resetting the knock detector 15 is produced so as to be ready for detecting the occurrence of the next engine knock.

In step Q10, in order to detect the state (presence or absence) of the knock signal ($\Delta K$) inputted in step Q8, it is determined whether or not $\Delta K$ is zero. If $\Delta K=0$, in step Q11, one is added to the content of the register C which serves as a counter and is provided to determine the presence or absence of engine knock. The result of the addition is stored in the register C. In step Q12, it is detected whether or not the content of the register C reaches "100"; that is, it is detected whether or not the knock signal ($\Delta K$) is zero over 100 ignition periods. If the content is 100 (C=100), in step Q13 the content of the register B for advance angle correction is compared with the advance angle correction upper limit which has been read and stored in the register D in step Q7.

In the case where the value of the content of the register B is smaller than that of the register D, the advance angle correction has not reached the upper limit. Therefore, in step Q14, one is added to the content of the register B, and the result of addition is stored in the register B.

In the case where the content of the register B is equal to or larger than that of the register D, in step Q15, the content of the register D is stored in the register B. As a result, the value of the register B for advance angle correction is set to the advance angle correction upper limit.

In step Q16, the content of the register C serving as a counter is reset to zero so as to be ready for the next 100-ignition-period count operation.

If, in step Q12, C≠100, the content of the register B is maintained unchanged, and step Q19 is effected.

When a nonzero knock signal ($\Delta K$) is detected in step Q10, then in step Q17, $\Delta K$ is subtracted from the content of the advance angle correcting register B so that the advance angle correction value is decreased according to the knock strength, that is, the ignition timing is delayed. In step Q18, the content of the register C is reset so as to be ready for the 100-ignition-period count operation.

Accordingly, the value (correction value) of the advance angle correcting register B, which is increased or decreased according to the state of knock, depends on the presence or absence (nonzero or zero value) of the knock signal detected every ignition period. That is, when the knock signal is nonzero, the correction value is decreased according to the knock strength, and when it is zero for 100 consecutive ignition periods, the correction value is increased by one, until the upper limit is reached. Thus, the change of the correction value can be positive, zero or negative.

In the above-described embodiment, the correction value is increased by one when there is no knock for 100 consecutive ignition periods; however, it should be noted that the invention is not limited thereto or thereby.

In order for the value (reference advance angle) read and stored in step Q6 to be corrected by the advance angle correction value thus determined to the final control value (advance angle control value), in step Q19, the value of the register B is added to the content of the register A, and the result of the addition is stored in an output register in step Q20.

The result of the addition is data which indicates the ignition position in angle which is to be controlled. In step Q21 the data is converted into time data representing a delay from the reference angle pulse position. The angle-to-time conversion can be readily achieved by utilizing the speed data in step Q3.

The advance angle control data, which has been converted into the time data in step Q21, is preset in a counter in the timing converter 18 in synchronization with the reference rotation angle pulse. When the content of the counter reaches zero in a period of time corresponding to the advance angle control data, the ignition timing signal is produced to interrupt the application of current to the ignition coil, thereby to determine the ignition timing.

As is apparent from the above description, in the second embodiment also, the engine ignition timing is determined according to a feedback control system in which the reference ignition timing is determined according to memory data programmed according to operating conditions, and the reference ignition timing is advanced or delayed by the correction value which is changed in the positive or negative direction according to the knock detection data. Accordingly, even in the operating mode in which the reference ignition timing is so set that it lags the ignition timing corresponding to the knock limit, feedback control is performed using the knock signal with the actual control ignition timing being allowed to lead the reference ignition timing. In the operating mode in which the knock limit exceeds the MBT of the engine, ignition with the advance angle exceeding the MBT of the engine is prevented by limiting the advance angle correction value.

Accordingly, for all operating conditions, the optimum ignition timing of the knock limit or control to the MBT of the engine is provided by the feedback control system in accordance with the detected knock signal. Thus, spark advance control can be achieved with high accuracy. Furthermore, it is not necessary for the reference ignition timing to be set so that it leads the ignition timing of the knock limit. Even if the reference ignition timing is set for the optimum ignition timing of the knock limit, feedback control utilizing knock detection is performed for all operating conditions. Therefore, the problem of the engine strongly knocking at the start of control when the reference ignition timing is advanced excessively can be prevented.

Figure 5:
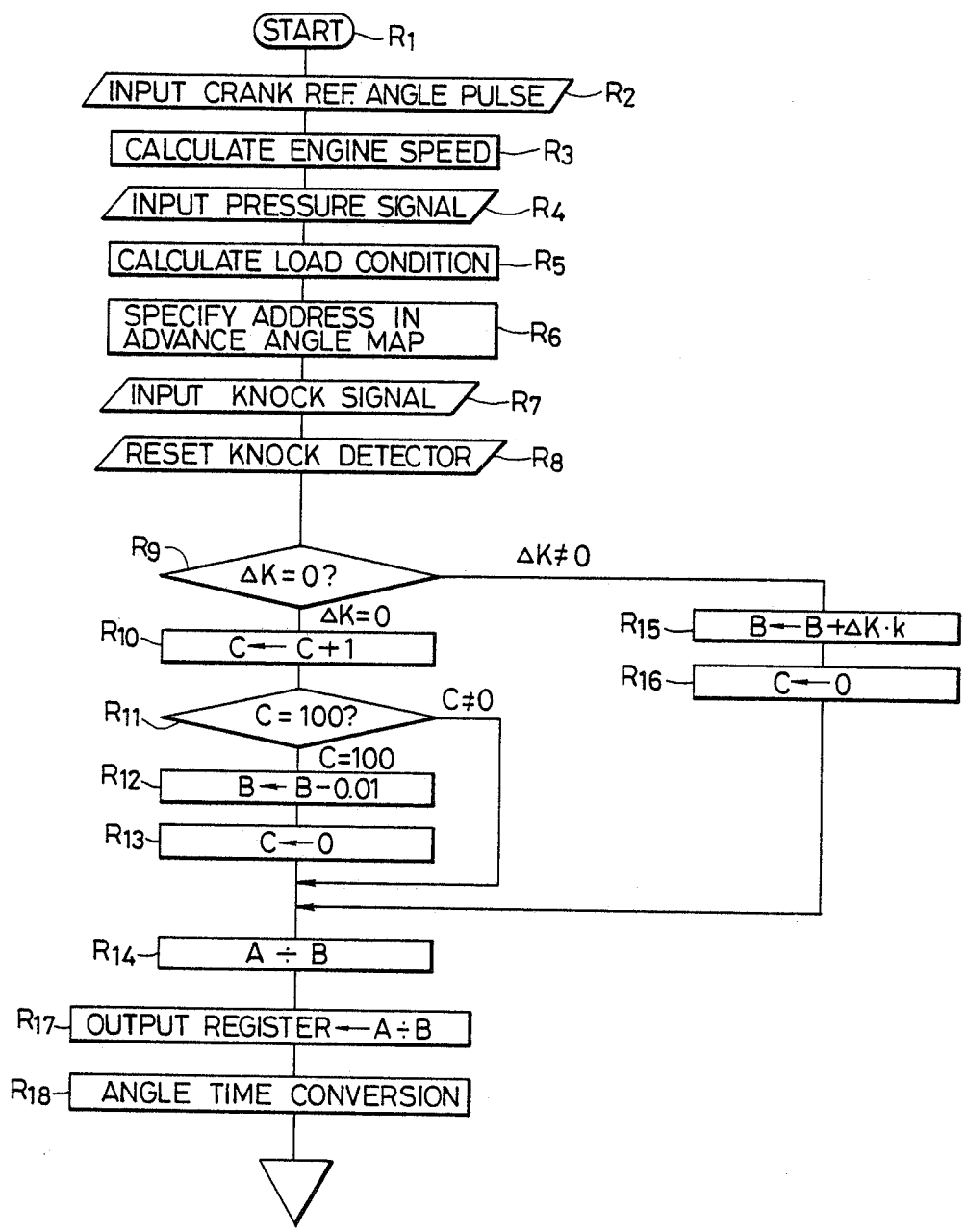

Similarly to the case of the second embodiment, a third embodiment of the invention can be provided by modifying the operating procedure of the microcomputer 20 in FIG. 2 as indicated in the flow chart in FIG. 5. That is, in the engine ignition timing control device, control values providing reference ignition timing characteristics are stored in the memory, the stored data is read out in response to the output of the engine operating condition sensor, and the data thus read out is multiplied by a correction factor obtained in response to the output of the knock detector to control the ignition timing with the correction factor being controlled so as to be larger than zero, zero or smaller than zero so that the reference ignition timing characteristic is set near the optimum ignition timing of the knock limit to suppress engine knock at the start of control. In the operating region where the reference ignition timing lags the best ignition timing of the knock limit, optimum ignition timing control is carried out. Thus in the engine ignition timing control device, optimum ignition timing is obtained for all operating modes.

In the third embodiment, the correction value calculator 6 increases or decreases the correction value according to the presence or absence of the detection signal from the knock detector 5. The correction factor is controlled so as to be larger than one, one or smaller than one.

The flow chart of FIG. 5 will be described. The flow chart includes steps R1 through R18. Steps R1 through R11 in FIG. 5 are the same as steps P1 through P11 in FIG. 3.

If C=100, in step R12, a predetermined value (for instance 0.01) is subtracted from the content of the advance angle correcting register B, and the result of the subtraction is stored. In step P13, the content of the register C serving as counter is reset to zero so as to be ready for the next 100-ignition-period count operation. On the other hand, if C≠100 in step R11, the content of the register B is maintained unchanged, and the next step P14 is effected.

If the knock signal is available in step R9 (ΔK≠0), in step R15, ΔK is added to the content of the register B to increase the advance angle correction value by ΔK·k, where k is a constant, corresponding to the knock strength. In the next step R16, the register C serving as a 100-period counter is reset so as to be ready for the next 100-period count operation.

Accordingly, the value (correction factor) of the advance angle correcting register B, which is increased or decreased according to the state of knock, depends on the presence or absence of the knock signal which is detected every ignition period. That is, when the knock signal is present (nonzero), the correction factor is increased as much as a value corresponding to the knock strength, and when the knock signal is not present (zero), the correction factor is decreased by the predetermined data after 100 consecutive ignition periods of zero knock signal. Thus, the correction factor is changed to be larger than one (which is the correction factor when no correction is made), one or smaller than one. In the above-described embodiment, the correction factor is decreased after 100 consective ignition periods of zero knock signal; however, the invention is not limited thereto or thereby.

The advance angle correction factor thus determined is used to correct the value (reference advance angle) read and stored in step R6 to obtain the final control value (advance angle control value). That is, in step R14, the value of the register A is multiplied by the value of the register B (the former being divided by the latter when it is required to reverse the direction of change of the correction factor), and the result of the calculation is stored in an output register in step Q17. The result of the calculation is data which indicates as an angle the ignition position which is to be controlled. In step R18, the data is converted into time data representing a delay from the reference angle pulse position. The angle-to-time conversion can be readily achieved by utilizing the speed data in step R3.

The advance angle control data, which has been converted into the time data in step R18, is preset in a counter in the timing converter 18 in synchronization with the reference rotation angle pulse. When the content of the counter reaches zero in a period of time corresponding to the advance angle control data, the ignition timing signal is produced to interrupt the application of current to the ignition coil, thereby to determine the ignition timing.

As is clear from the above description, in the third embodiment, the engine ignition timing is determined with the use of a a feedback control system in which the reference ignition timing is determined according to memory data programmed according to the operating conditions, and the reference ignition timing is advanced or delayed in response to the correction factor which is changed to be larger than one, one or smaller than one according to the knock detection data. In the operating mode in which the reference ignition timing lags the ignition timing corresponding to the knock limit, the correction factor is opposite in magnitude to that for the operating mode in which the reference ignition timing leads the ignition timing corresponding to the knock limit. Thus, feedback control can be performed while the actual control ignition timing is being controlled to lead the reference ignition timing. In all operating conditions, the optimum ignition timing of the knock limit can be obtained by the feedback control system while the knock signal is being detected. Thus, spark advance control can be achieved with high accuracy. Furthermore, it is not necessary for the reference ignition timing to be set so that it leads the ignition timing of the knock limit. Even if the reference ignition timing is set at the optimum ignition timing of the knock limit, feedback control utilizing knock detection is performed for all operating conditions. Therefore, the problem of the engine knocking strongly at the start of control when the reference ignition timing is advanced excessively is prevented.

I claim:

1. An ignition timing control device for an engine, comprising:

knock detecting means for detecting knocking of said engine;

an operating condition sensor for sensing predetermined operating conditions of said engine;

memory means in which reference control values for providing reference ignition timing characteristics are stored at addresses determined in correspondence to said operating conditions, an output of said operating condition sensor being applied to an address input of said memory means to read out one of said reference control values;

discriminating means for discriminating in response to an output of said knock detecting means whether or not engine knocking has occurred;

means for producing an ignition timing correction factor by increasing or decreasing a previous value according to an output of said discriminating means, said correction factor being greater than, equal to, or less than 1; and means for determining ignition timing of said engine in accordance with a control value obtained by multiplying or dividing said one of said reference control values thus read out by said correction factor, said determining means comprising means for selectively decrementing, maintaining unchanged, or incrementing said one of said reference control values, depending on whether said correction factor is greater than, equal to, or less than 1, ones of said correction factor for an operating condition where a reference ignition timing lags an optimum ignition timing of a knock limit of said engine and for an operating condition where a reference ignition timing leads said optimum ignition timing of said knock limit being of opposite magnitudes.

* * * * *